US006722920B2

(12) United States Patent
Zhang

(10) Patent No.: US 6,722,920 B2
(45) Date of Patent: Apr. 20, 2004

(54) ELECTRICAL CONNECTOR ASSEMBLY WITH SECUREMENT DEVICE

(75) Inventor: Jian Zhang, Kunsan (CN)

(73) Assignee: Hon Hai Precision Ind. Co., Ltd., Taipei Hsien (TW)

( * ) Notice: Subject to any disclaimer, the term of this patent is extended or adjusted under 35 U.S.C. 154(b) by 0 days.

(21) Appl. No.: 10/266,739

(22) Filed: Oct. 7, 2002

(65) Prior Publication Data

US 2003/0139093 A1 Jul. 24, 2003

(30) Foreign Application Priority Data

Jan. 23, 2002 (TW) ...................................... 91200634 U

(51) Int. Cl.[7] ........................... H01R 13/73; H02B 1/01

(52) U.S. Cl. ........................ 439/571; 439/564; 439/567

(58) Field of Search ................................ 439/571, 567, 439/564, 573

(56) References Cited

U.S. PATENT DOCUMENTS 4,309,856 A 1/1982 Varnau et al.
4,681,389 A 7/1987 Nakazawa et al.
4,875,140 A 10/1989 Delpech
5,201,661 A * 4/1993 Ii ................................ 439/79
5,435,750 A * 7/1995 Kosmala ..................... 439/567
5,980,314 A * 11/1999 Roberts ...................... 439/567
6,024,603 A 2/2000 Chen et al.
6,190,201 B1 * 2/2001 Shih et al. .................. 439/567
6,296,496 B1 10/2001 Trammel
6,435,905 B1 * 8/2002 Yu et al. ..................... 439/567

* cited by examiner

*Primary Examiner*—Hae Moon Hyeon
(74) *Attorney, Agent, or Firm*—Wei Te Chung

(57) ABSTRACT

An electrical connector assembly (1) comprises an electric card (4), an insulative housing (20), an upper and lower rows of contacts (21) accommodated in the housing, and a pair of securement devices (3) assembled into the housing. The electric card defines a pair of through holes (41) therein. The housing comprises a main body (201) and a pair of support portions (200). Each support portion defines a groove (2020) and a receiving hole (2021) defined in the support portion from a bottom face of the groove. The securement device comprises a base portion (31), a protrusion (32) protruding downwardly from the base portion for being received into the groove, and a pair of opposite legs (33) extending downwardly from the protrusion. Each leg has an engaging face (332) abutting against a lower face (44) of the electric card to fix the electric card with the housing.

10 Claims, 4 Drawing Sheets

ELECTRICAL CONNECTOR ASSEMBLY WITH SECUREMENT DEVICE

BACKGROUND OF THE INVENTION

1. Field of the Invention

The present invention relates to a securement device for locking or securing two components together, such as an electrical connector and a card.

2. Description of Related Art

Devices for securement of planar elements such as those utilized in electronic components are well-known and widely employed. In conventional connectors, a securement post is mounted on a connector that protrudes through the connector. The securement post aligns the connector to a pair of planar elements such as a motherboard and daughtercard by holes located in the boards just for this purpose. Examples of such connectors include U.S. Pat. No. 4,309,856 to Varnau et al. which discloses a resilient device for securing panels in parallel spaced relation to a support bracket; U.S. Pat. No. 4,875,140 to Delpech which discloses a support device for printed circuit boards formed by a column having at least one base on which a circuit board is to be supported with the boards and a coupling member fixed by a screw. Referring to FIG. 1, an electrical connector assembly for interconnecting a card 70 with a mother board 80 comprises a housing 60, a plurality of terminals 61 received in the housing 60, and a securement post 90. The housing 60 comprises a main body 601 and a pair of arms 610 rearwardly projecting from opposite ends of the main body 601. The securement post 90 made of metal material is an elongate pin. When the card 70 is assembled to the connector, the securement post 90 extends downwardly through a receiving hole 602 of the arm 610 and a through hole 72 defined in the card 70, and is finally fixed by a screw 91. Thus, the securement post 90 locks the card 70 on the housing 60 of the connector.

One problem inherent in such connector as an additional fastening hardware is required to join the assembly of a connector and a card together.

It is thus desirable to provide a securement device of an electrical connector to alleviate or even eliminate the above-discussed problem.

SUMMARY OF THE INVENTION

Accordingly, it is an object of the present invention to provide a securement device that provides fixation of a card and a connector together.

To fulfill the above mentioned object, an electrical connector assembly in accordance with the present invention comprises an electric card, an insulative housing, an upper and lower rows of contacts accommodated in the housing, and a pair of securement devices assembled into the housing. The electric card forms a plurality of conductive traces on an upper face and a lower face thereof, and a pair of through holes defined in the electric card. The housing comprises a main body and a pair of support portions extending from opposite ends of the main body, and each support portion defines a groove on a top face of the support portion and a receiving hole on a bottom face of the groove. The upper and lower row of contacts assembled to the housing, and the contacts electrically connect the corresponding conductive traces of the upper and lower faces of the electrical card. The securement devices are assembled into the receiving holes of the support portions and the through holes of the electric card. Each securement device comprises a base portion, a protrusion protruding downwardly from the base portion for being received into the groove of the support portion and a pair of opposite resilient legs extending downwardly from the base portion. Each leg has an engaging face abutting against the lower face of the electric card to fix the electric card with the housing.

Other objects, advantages and novel features of the invention will become more apparent from the following detailed description of the present embodiment when taken in conjunction with the accompanying drawings.

DETAILED DESCRIPTION OF THE PREFERRED EMBODIMENT

Figure 1:
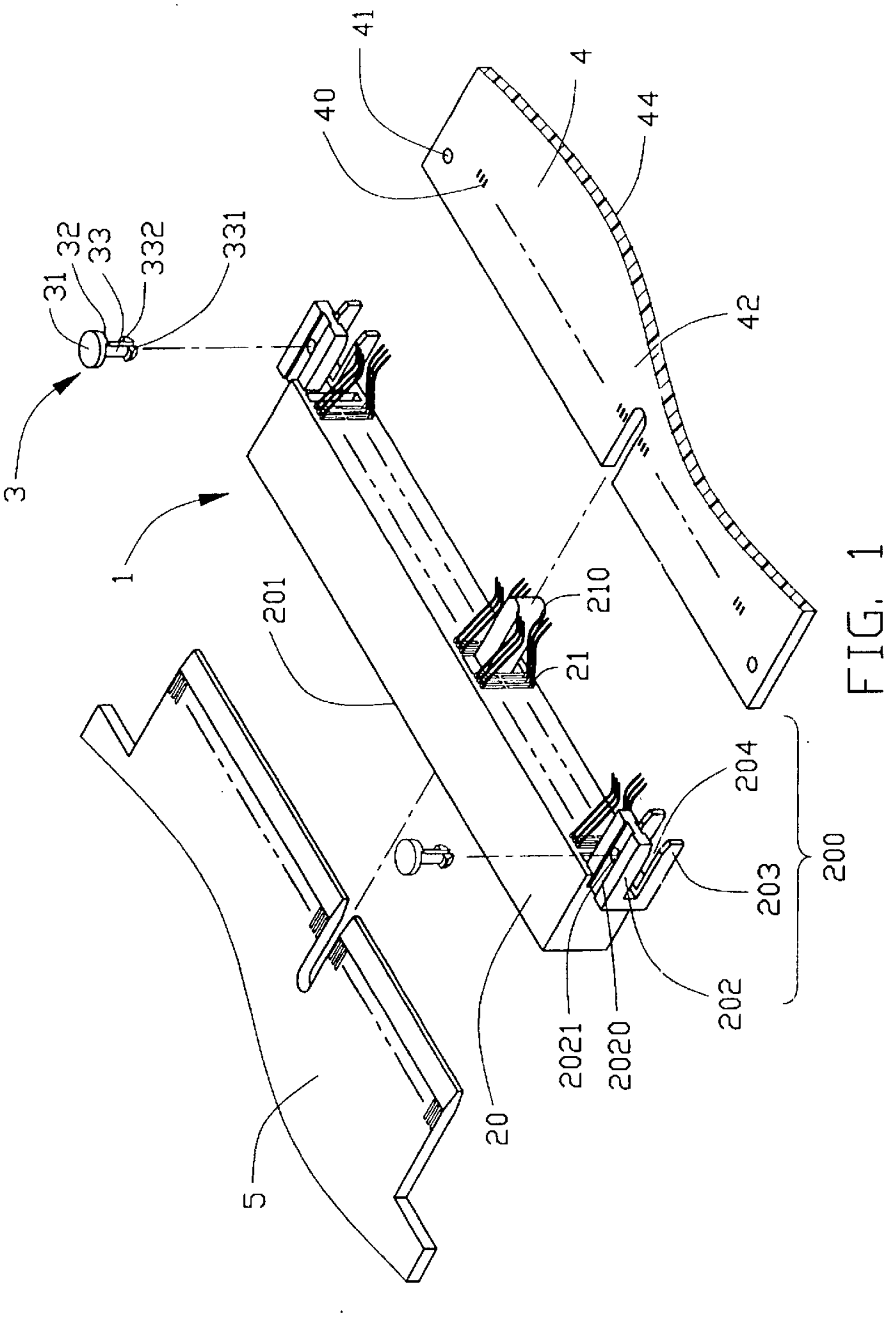
FIG. 1 is an exploded view of a connector assembly of the present invention before a card is assembled to the connector.
Figure 2:
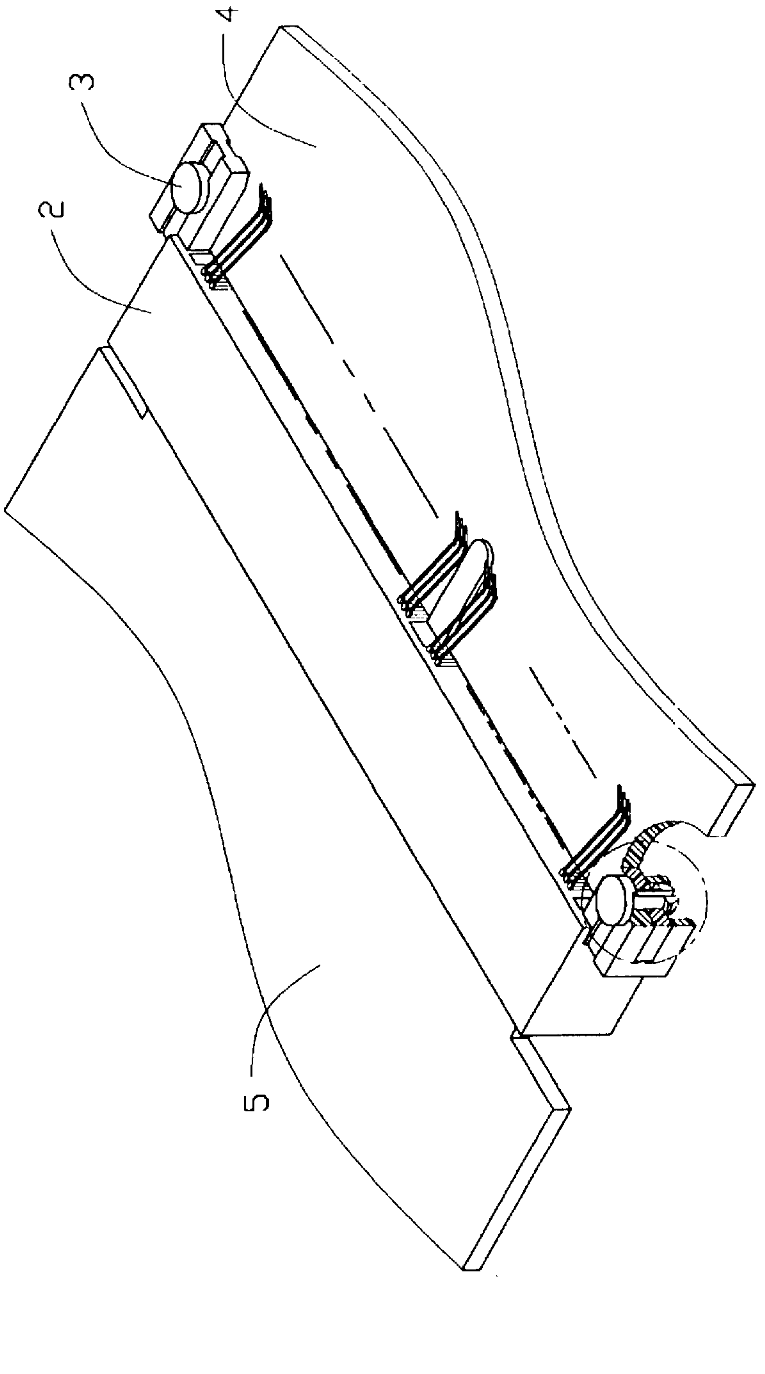
FIG. 2 is perspective of the present invention when the card fully inserts into the connector.
Figure 3:
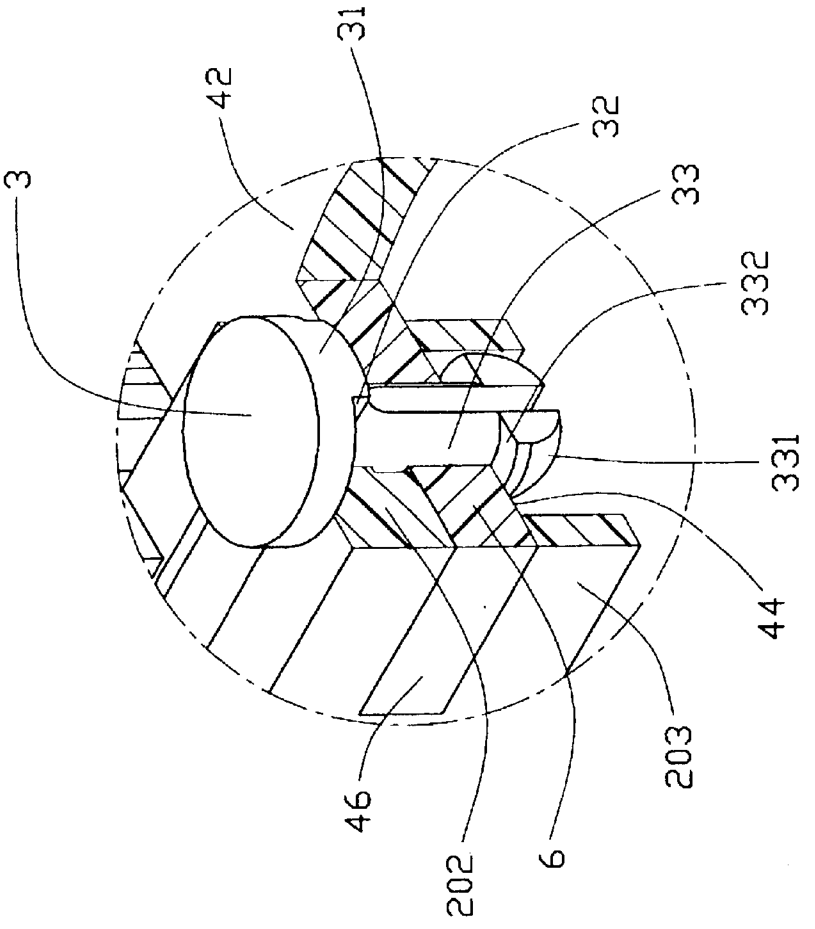
FIG. 3 is a partially, enlarged view showing the securement device of FIG. 2.
Figure 4:
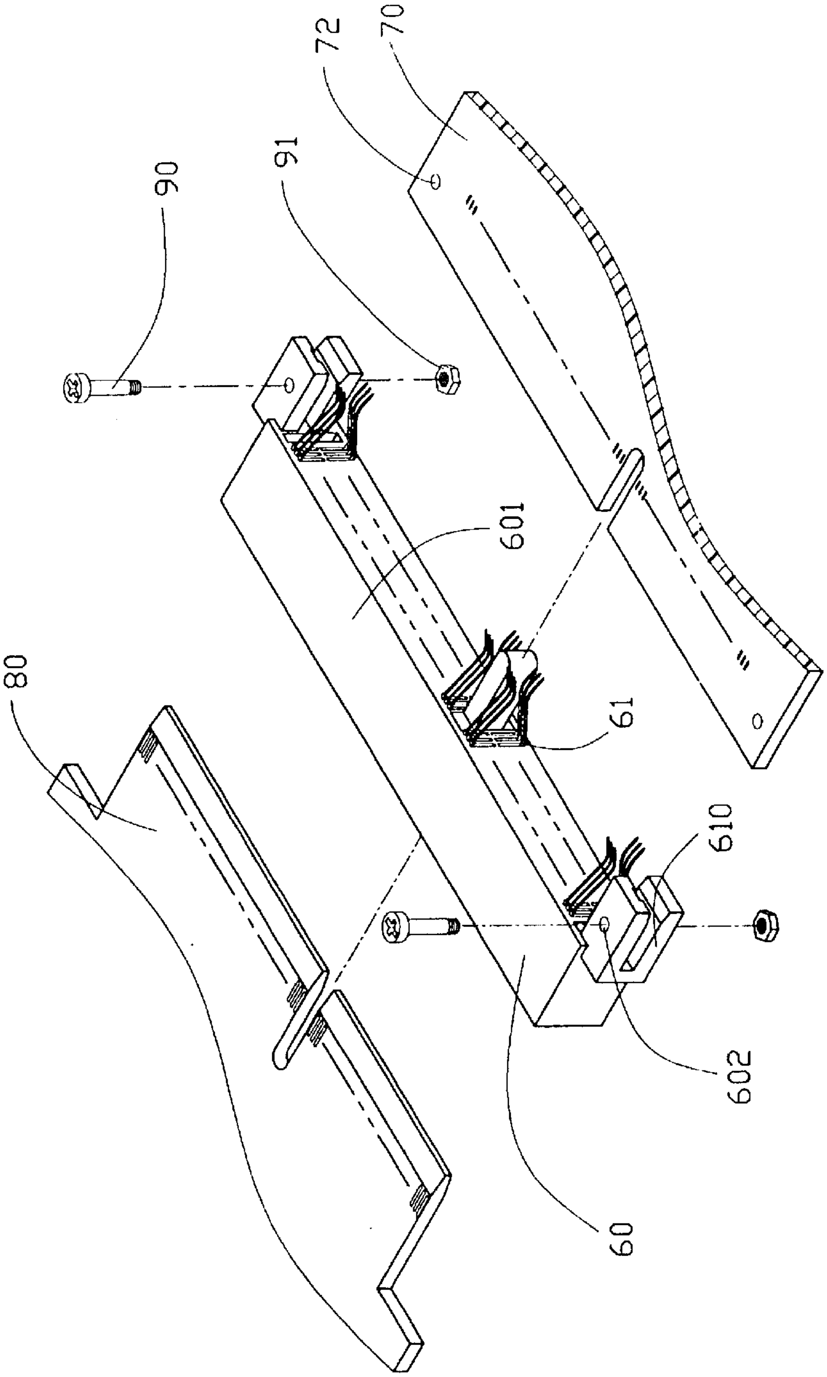
FIG. 4 (RELATED ART)
FIG. 4 is a perspective view of a connector assembly with a card in accordance with the related art.

Referring to the drawings and in particular to FIGS. 1 and 2, a connector assembly 1 for interconnecting an electric card 4 with a mother board 5 according to the present invention comprises a housing 20, an upper and lower rows of contacts 21 accommodated in the housing 20, and a pair of securement devices 3.

The housing 20 comprises an elongate main body 201 and a pair of support portions 200 extending from opposite ends of the main body 201. The support portion 200 comprises an upper portion 202, a lower portion 203 and a slit 204 defined between the upper portion 202 and the lower portion 203. The lower portion 203 comprises a pair of support beams. A narrow groove 2020 is defined on a top face of the upper portion 202. A circular receiving hole 2021 is defined in the support portion from a bottom face of the groove 2020.

The upper and lower rows of contacts 21 are inserted molded in the housing. Each contact includes a tail portion 210 extending beyond the housing for electrically connecting the electric card 4 and a solder portion (not shown) for soldering onto the mother board 5.

The securement device 3 comprises a base portion 31, a protrusion 32 projecting downwardly from a bottom face of the base portion 31, and a pair of opposite resilient legs 33 extending downwardly from the protrusion 32. A shape of the protrusion 32 of the securement device 3 just accommodates with that of the groove 2020 of the support portion 202 with a width of the protrusion 32 slightly lesser than a width of the groove 2020, and an outer diameter of the base portion 31 larger than the width of the groove 2020. Each leg 33 has a latch portion 331 at a free end thereof, and an engaging face 332 formed on the latch portion 331.

The card 4 comprises an upper face 42 and a lower face 44 on which conductive traces 40 are formed thereon. A pair of through holes 41 is defined in the card 4 for respectively allowing the legs 33 of the securement devices 3 to extend therethrough.

In assembly, when the card 4 is assembled to the housing 1, a front edge of the card 4 is inserted in the slits 204 of the support portions 200, the tail portions 210 are surface mounted to the corresponding conductive traces 40 on the upper face or the lower face of the card 4. The securement devices 3 are inserted into the receiving holes 2021, and the protrusions 32 are fully received in the grooves 2020. The securement devices 3 are inserted into the receiving holes 2021 of the support portions 200 and the through holes 41 with the base portions 31 abutting against to the top faces of the support portions 200, the protrusions 32 respectively received into the grooves 2020, the engaging faces 332 of the legs 33 abutting against the lower face 44 of the card 4.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. An electrical connector assembly comprising:

an electric card forming a plurality of conductive traces both on an upper face and a lower face thereof, and a pair of through holes defined therein;

an insulative housing comprising a main body and a pair of support portions extending from opposite ends of the main body, each support portion defining a groove on a top face thereof, and a receiving hole defined in the support portion from a bottom face of the groove;

an upper row of contacts and a lower row of contacts accommodated in the housing, the contacts electrically contacting the corresponding conductive traces of the upper and lower faces of the electrical card; and a pair of securement devices assembled into the receiving holes of the support portions and the through holes of the electric card, each securement device comprising a base portion abutting against the top face of the support portion, a protrusion protruding downwardly from the base portion and received into the groove of the support portion for preventing the securement device from rotating, and a pair of opposite resilient legs extending downwardly from the protrusion of the securement device, each leg having an engaging face abutting against the lower face of the electric card to fix the electric card with the housing.

2. The electrical connector assembly as described in claim 1, wherein a shape of the protrusion of the securement device just accommodates with that of the groove of the support portion.

3. The electrical connector assembly as described in claim 2, wherein a width of the groove is slightly larger than a width of the protrusion, but slightly smaller than a diameter of the base portion.

4. The electrical connector assembly as described in claim 1, wherein the support portion further comprises an upper portion, and a lower portion, a slit is defined between the lower portion and the upper portion and receives a front edge of the card therein.

5. The electrical connector assembly as described in claim 4, wherein the groove and the through hole are defined in the upper portion of the support portion.

6. The electrical connector assembly as described in claim 4, wherein the lower portion comprising a pair of opposite support beams abutting against the lower face of the card when the card is inserted into the connector.

7. An electrical connector assembly comprising:

an electric card forming a plurality of conductive traces on an upper face and a lower face thereof, and a pair of through holes defined in the electric card;

an insulative housing comprising a main body and a pair of support portions extending from opposite ends of the main body, each support portion defining a receiving hole;

an upper row of contacts and a lower row of contacts accommodated in the housing, the contacts electrically contacting the corresponding conductive traces of the upper and lower faces of the electrical card; and a pair of securement devices assembled into the receiving holes of the support portions and the through holes of the electric card, each securement device comprising a base portion, and a pair of opposite resilient legs extending downwardly from the base portion, each leg having an engaging face abutting against the lower face of the electric card to fix the electric card with the housing: wherein each support portion defines a groove on a top face of the support portion, and the securement device comprises a protrusion protruding downwardly from the base portion thereof and being received into the groove of the support portion for preventing the securement device from rotating.

8. The electrical connector assembly as described in claim 7, wherein a width of the groove is slightly larger than a width of the protrusion, but slightly smaller than a diameter of the base portion.

9. The electrical connector assembly as described in claim 7, wherein the receiving hole is defined in the support portion from a bottom face of the groove.

10. The electrical connector assembly as described in claim 7, wherein the groove is defined in the support portion along a mating direction.

* * * * *